(12) United States Patent (10) Patent No.: US 7,823,086 B2
Perantatos et al. (45) Date of Patent: Oct. 26, 2010

(54) PUBLISHING PROTOCOL EXTENSIONS FOR ENHANCED AUTHORING OF WEB PAGES

(75) Inventors: George Perantatos, Seattle, WA (US); Robin A. Smith, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 11/770,343

(22) Filed: Jun. 28, 2007

(65) Prior Publication Data
US 2009/0006953 A1 Jan. 1, 2009

(51) Int. Cl.
*G06F 13/00* (2006.01)
*G06F 15/00* (2006.01)
(52) U.S. Cl. .................................. 715/853; 707/153
(58) Field of Classification Search ......... 715/763–765, 715/851–855, 738–742, 513–517; 707/10, 707/513
See application file for complete search history.

(56) References Cited

U.S. PATENT DOCUMENTS

| 7,039,594 | B1 | 5/2006 | Gersting ........................ 705/7 |
| 7,610,219 | B2* | 10/2009 | Sayed .......................... 705/26 |
| 2002/0083097 | A1* | 6/2002 | Warrington ................. 707/513 |
| 2004/0216084 | A1 | 10/2004 | Brown et al. ................. 717/102 |
| 2005/0132056 | A1 | 6/2005 | Creamer et al. ............. 709/227 |
| 2006/0031811 | A1 | 2/2006 | Ernst et al. .................. 717/100 |
| 2006/0059465 | A1 | 3/2006 | Kogan et al. ................. 717/121 |
| 2006/0168125 | A1 | 7/2006 | Leo Spork .................. 709/219 |
| 2006/0212792 | A1 | 9/2006 | White et al. ................. 715/511 |
| 2007/0011665 | A1 | 1/2007 | Gandhi et al. ............... 717/136 |
| 2007/0038610 | A1 | 2/2007 | Omoigui ........................ 707/3 |
| 2007/0094304 | A1 | 4/2007 | Horner et al. ............. 707/104.1 |
| 2008/0147671 | A1* | 6/2008 | Simon et al. .................. 707/10 |

OTHER PUBLICATIONS

Browning, Paul, "JISC TechWatch Report: Through the Web (TTW) Authoring Tools," University of Bristol, Dec. 2003, 44 pp.
"RedDot Web Content Management," RedDot Solutions, Web Solutions Group, US May/2006, New York, NY, 8 pp.

* cited by examiner

*Primary Examiner*—Kevin Nguyen
(74) *Attorney, Agent, or Firm*—Merchant & Gould

(57) ABSTRACT

An extension of the capabilities of existing web publishing protocols provide support for web content management features typically found only in web content management systems. Any client that supports these extensions can utilize these features. These extensions allow for additional metadata, additional state information about the page, additional field information, and server styles to be passed to the client, edited or applied, and returned to the server. The extensions model specific information from the server, to the client, and back to the server. All metadata, field values, and styles passed back from the client to the server will be applied to the page on the server. Any state change on the page will be applied to the page on the server. The server and client each interpret and process the extensions in a way that offers the user a better end-to-end story for publishing web pages from a client application.

17 Claims, 4 Drawing Sheets

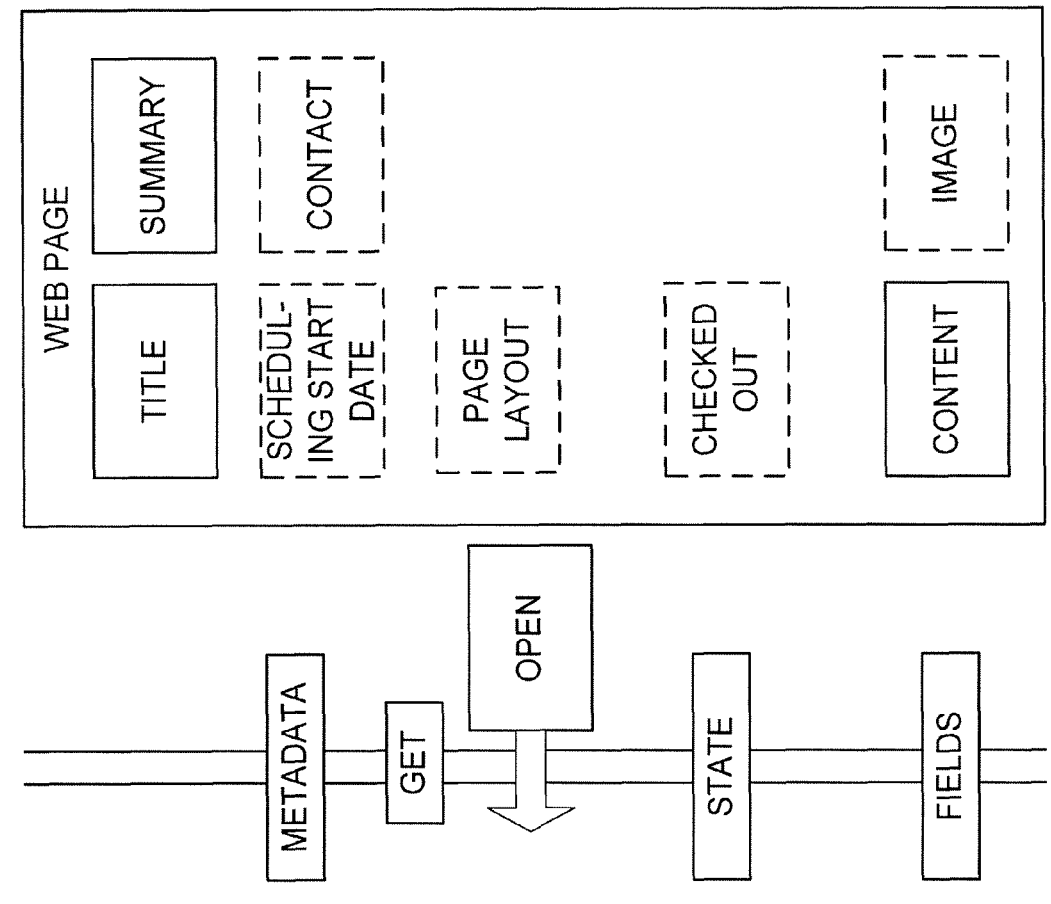
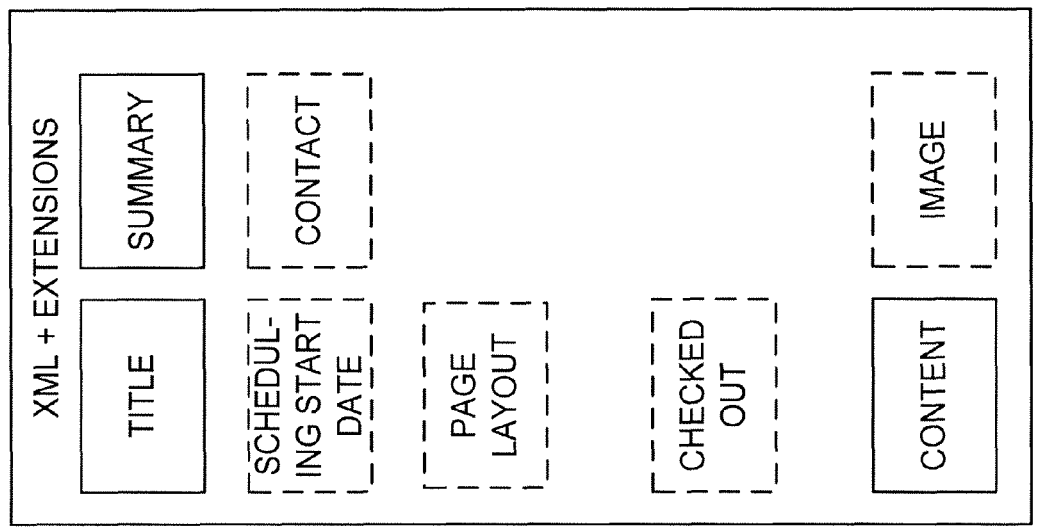
FIG. 1

PUBLISHING PROTOCOL EXTENSIONS FOR ENHANCED AUTHORING OF WEB PAGES

BACKGROUND

This application relates to protocols for publishing content between a client application and a server for the purposes of creating or updating web content for publishing to a web content management system, like a weblog, a corporate website, or a news website, and more particularly, to extending the capabilities of existing publishing protocols by providing support for features typically found only in a web content management system.

A weblog, or blog, is a website where entries are written in chronological order and displayed in reverse chronological order. Weblogs provide commentary or news on a particular subject such as food, politics, or local news. Some weblogs function as more personal online diaries. A typical weblog combines text, images, and links to other weblogs, web pages, and other media related to its topic. A blogger is a person who creates content for and maintains a weblog. A similar role is played by individuals who are responsible for maintaining an intranet website, a corporate website, a news website, and the like.

Such individuals typically use a web browser in order to create new content, modify existing content, or remove content from their website. Using a web browser requires that the user be online. If there is problem with connectivity in using the web interface, then the user may be prevented from taking any action on the website content. The online tools available to the user for creating, modifying, or removing content are typically not very rich or as advanced as offline tools associated with other applications. The online tools may be limited to a simple text editor that may or may not even have a spell checker. Rich formatting for styling tables and charts is typically not available.

Atom Publishing Protocol ("APP") is an example of a simple HTTP-based protocol for creating and updating Web resources online. The Atom Publishing Protocol is an application-level protocol for publishing and editing Web resources belonging to periodically updated websites. The protocol at its core is the HTTP transport of Atom-formatted representations. APP defines a feed format for representing, and a protocol for editing, Web resources such as Weblogs, online journals, Wikis, intranet and corporate websites, and the like. The feed format enables syndication; that is, provision of a channel of information by representing multiple resources in a single document. The editing protocol enables agents to interact with resources by nominating a way of using existing Web standards in a pattern. MetaWeblog API is another example of a Web protocol, but it also does not support the additional features common to a web content management system.

Even with protocols such as APP and MetaWeblog API, these online solutions are just not as advanced compared to what is available from offline applications, such as word processors or content publishing applications, such as a web page editing application or a print layout application. Plus, the user has to be online to be able to use them, denying the user the flexibility to work on content whenever and wherever the user may be, such as in an airplane, a doctor's office, or on vacation in a remote part of the world where online access is not available or convenient.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

This application describes a way of extending the capabilities of existing web publishing protocols with additional extensions that provide support for web content management features typically found only in web content management systems. Any client that supports these extensions can expose and take advantage of these features. These extensions allow for:

additional metadata to be passed to the client, set by the user, and returned to the server;

additional state information about the page to be passed to the client to inform the client of the appropriate actions available for the page on the client;

additional field information to be passed to the client, to represent a web page with multiple fields (or pieces) of visible, editable content as opposed to simply properties; and server styles (such as Cascading Style Sheets ("CSS"), which provide a simple mechanism for adding style such as fonts, colors, spacing, etc. to Web documents) are made available to the client so that the client can present a WYSIWYG view of the content to the user.

The extensions model specific information from the server, to the client, and back to the server. All metadata and field values passed back from the client to the server will be applied to the page on the server. Any state change on the page will be applied to the page on the server. When published the content of the client looks the same on the server, by virtue of both the client and server using the same server style. The server and client each interpret and process the extensions in a way that offers the user a better end-to-end story for publishing web pages from a client application.

BRIEF DESCRIPTION OF THE SEVERAL VIEWS OF THE DRAWINGS

FIG. 1 shows a schematic/block diagram of a web page being accessed by a client for editing in one embodiment.

DETAILED DESCRIPTION

Figure 2:
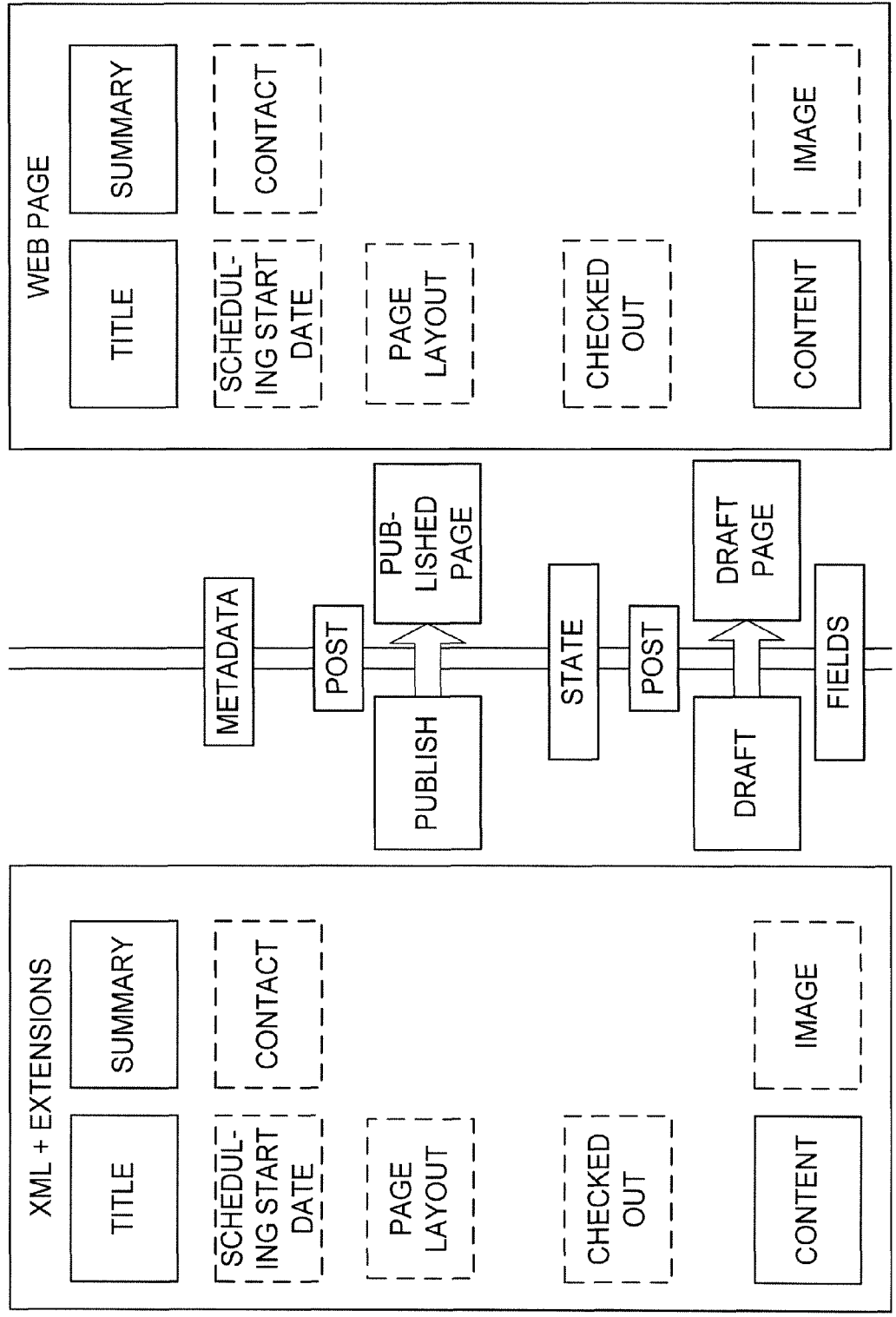
FIG. 2 shows a schematic/block diagram of a web page being posted by a client back to a server in one embodiment.

The invention may be implemented as a computer, a computing system, or as an article of manufacture such as a computer program. The computer program product may be a computer storage medium readable by a computer system and encoding a computer program of instructions for executing a computer process. The computer program product may also be a propagated signal on a carrier readable by a computing system and encoding a computer program of instructions for executing a computer process.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The problem that currently exists in creating new content or modifying existing content from a blog or website is that even with the current protocols designed for this purpose, such as APP and MetaWeblog API, as well as the current client tools, they are still not rich enough for websites that are more complicated, such as a corporate website, a brochure type site, or a news website such as MSNBC.com and others. The content has more structure to it, and there is more metadata and more state information to the content that the current solutions are not able to handle.

One of the things that the current solutions will not do is go beyond one region of content for the web page. For example, on a news website an author may have articles that may encompass several regions of the web page: the body, the byline, one or more images (graphs, pictures, etc.), the author, the date and location, etc. There is typically a work flow to getting an item posted on such a web page from the genesis of the item to the actual publication. The item may first have to be checked in and then reviewed by an editor to get the item approved, or even reviewed by legal counsel, or both. The item may have to go through several iterations before it is finally approved and ready to actually go live on the website. Web content management systems focus more on the content management needs, while the current protocols do not go far enough to fully support these web content management systems. The current tools offer only a very simplistic sort of approach that is basically a draft and publish model that is simply not rich enough for many websites where one or more editors or maybe even legal counsel may have to review the item. In addition, discrete information has to be entered in each of the different regions separately. Assuming that a website does support an existing protocol like APP or MetaWeblog API, the user would have to edit some of the contents and metadata in a word processing application, such as Microsoft Word, and manually copy and paste the content from the client to the server, or alternatively, save that content up to the server, then go to the server via a web browser, open up the web page, and then continue editing that content in the web browser, such as adding an image to go along with the text content. There is no one place where the user can work on all of the content at the same time. The user has to go back and forth between one or more applications and the web browser. There is no easy way of pushing up all of the content from one place. The protocols only support one region of actual content at a time.

The ability to create content in an offline client environment and then push that content out to a web page is accomplished through extending existing web protocols, or any future web protocols that may be developed. This approach provides a way of modeling information content including metadata, fields, and state information that can be passed back and forth between client and server. Any client that speaks the "language" of the protocol may use these extensions, giving the client the ability to operate on the metadata and operate on more complex content on the website, greatly enriching the types of data that can be passed between the client and the website. Also, distinguishing a piece of information as metadata versus content will allow the client to determine whether the data needs to be rendered in a document properties panel or on the actual canvas, or displayed area, on the website.

In one embodiment, extensions are added to APP, which utilizes the Extensible Markup Language ("XML"), with additional sections of XML, in order to represent the following information about a web page: metadata, state, and fields. One skilled in the art will recognize that similar extensions may be added to other API's, such as MetaWeblog API and others, to accomplish the same functionality, and the extensions shown for APP are just one example. The following tables show some of the extensions that may be added to APP. One skilled in the art will recognize that other extensions besides these listed are possible. TABLE 1 shows additional pieces of metadata offered for a web page:

TABLE 1

METADATA

| NAME | Type | DESCRIPTION |
| --- | --- | --- |
| Scheduling Start Date | Datetime | The date and time when a page is scheduled to go live |
| Scheduling End Date | Datetime | The date and time when a page is scheduled to expire |
| Contact | ID | The user assigned as the contact for this page (represented by an ID that is expanded on the server) |
| Contact Name | String | The name of the user assigned as the contact for this page (applicable when the Contact ID is not used) |
| Contact Email | String | The email address of the user assigned as the contact for this page (applicable when the Contact ID is not used) |
| Contact Picture | URL | The Uniform Resource Locator ("URL") to a picture of the user assigned as the contact for this page (applicable when the Contact ID is not used) |
| Page Layout | ID | An ID representing the page layout, or template, assigned for this web page |
| Audience Targeting | ID | An ID or set of IDs representing the audiences that this web page is targeted to |

State information is also passed down to the client via XML. Regarding states, there is a common pattern in content management systems of what to do with content in terms of checking it out, putting a lock on it, checking it back in, and having draft versions versus published versions. Typically there are only a few well defined available states. Some valid states are shown below in TABLE 2. However, one skilled in the art will recognize that other states besides these listed are possible.

TABLE 2

STATES

| NAME | DESCRIPTION |
| --- | --- |
| Published | The page is a major version, and is available for all readers of the website |
| Checked out | The page is checked out by an author and is being edited. Only that author can see the page. |
| Draft | The page is checked in and available to all authors and editors to see, but is not available to readers. |
| Pending Approval | The page has been submitted for approval. A user or set of users must approve the page before it becomes Published. |

TABLE 2-continued

STATES

| NAME | DESCRIPTION |
| --- | --- |
| Approved | The page is approved. It may not be live yet because of a pending activity (such as a scheduling date not having arrived). |
| Rejected | The page is rejected. It will not be published. |

The server will pass down current state as well as valid next states. The client is responsible for drawing the UI for expressing this information to the user.

In addition, page content fields are passed down to the client via XML. These fields are dependent on the page type, and the extensions support any number of instances of these types. The XML contains the name, type, and contents of the fields. The model supports extended fields, provided the data can either be sent down to the client directly, or reference a method on the server for delivering valid choices and/or validating the user's entry, such as a keyword. All that is required is: the name of the type; the valid values for the type, or where to fetch valid values from the server; and validation rules for the type (such as max length). Some types supported are shown below in TABLE 3. One skilled in the art will recognize that other types besides these listed are possible. Other types of data may include: language and culture, strings, binary (streams/files), integer, float, taxonomy (a very complex field type), multi-valued (like an array of fields), and hierarchical groupings (sets of nodes arranged in hierarchical fashion where each node is one of the above types).

TABLE 3

FIELDS

| NAME | VALUES | DESCRIPTION |
| --- | --- | --- |
| Single Line Of Text | Defined by client, current value in XML | A short string of text, like a title |
| Multiple Lines Of Text | Defined by client, current value in XML | A longer string of text, like a description |
| Choice | Defined by server, available choices and current choice in XML | A choice, offered as a drop-down or radio buttons. |
| Number | Defined by client, range and current value defined in XML | A number |
| Currency | Defined by client, range, type, and current value defined in XML | A currency value |
| Datetime | Defined by client, range, type, and current value defined in XML | A date and time |
| Lookup | Defined by server, XML offers lookup to server to fetch available values | A lookup to another column's values. The server will need to provide the available values to the client on-demand. |
| Boolean | Defined by client, current value in XML | A yes or no question |
| Person/Group | Defined by server, XML offers lookup to server to fetch available values | An ID of a person or group. The server will need to provide the available values to the client on-demand. |
| Hyperlink | Defined by client, XML offers current value | A URL, such as to another page. |
| HTML | Defined by client, XML offers restrictions and current value | HTML content, such as the body of the page. |
| Image | Defined by client, XML offers current value | An image URL |

This XML is passed along with the base Atom Publishing Protocol content to the client. The client is responsible for providing an interface for setting the metadata, editing the fields in the context of the web page content, and setting the state. Once the client publishes back to the server, the server is responsible for updating the page to reflect the new metadata, state, and fields received from the client. Specifically, all metadata and field values passed back from the client to the server will be applied to the page on the server, and any state change on the page will be applied to the page on the server. Validation will be transmitted back to the client from the server over APP XML. For example, if a piece of metadata is required, but the user has not entered a value for it on the client, the server will pass back this error to the client. It is the responsibility of the client to handle this error and present the UI in a way that clearly indicates what portion of the content or metadata had a validation error.

Referring now to the Figures, in which like reference numerals and names refer to structurally and/or functionally similar elements thereof, FIG. 1 shows a schematic/block diagram of a web page being accessed by a client for editing in one embodiment. Referring now to FIG. 1, the user, operating from a Client, has accessed a Web Page from the Server in order to edit the existing Web Page. The boxes in solid lines represent the base functionality of the APP. The boxes in dashed lines represent the extensions that have been added to the APP that are relevant to this particular web page. The Metadata, State, Field boxes, and server styles represent the totality of information that is passed between the Server and the Client relating to the Web Page. The Get operation Opens the Web Page and the information about Metadata, State, and Field must all come down to the Client. The Client takes that information and may take appropriate action. Once the Client has made a connection to the Server to retrieve the Web Page, the connection to the Server is no longer needed. The user can work offline until the user is ready to post back to the Server. Without the added extensions, it would not be possible to do this. With the base APP the user would have to be connected all the time to the Server.

The Web Page is Checked Out to the user and the information for the Web Page is opened up in Microsoft Word in the context of a Word document. The state of the Web Page is Checked Out which maps to one of the discrete available states that a web page can be. In this case the Web Page is now locked, meaning that it is Checked Out. In this example the Web Page is a news article which has a Title and a Summary, and it has a Scheduling Start Date that it will go live on the website. The news article also has a particular Contact e-mail address and a Page Layout. This news article could be based on a particular template that the user could render the web page. A template is a way that a user can pre-wire repetitive work to do something with its content and to handle some those behaviors in a particular way.

The user may enter new Content or revise or delete existing Content of the Web Page, and may set Metadata for the Web Page. The user may also from within Microsoft Word, or any client for that matter that can speak the language of the protocol, actually check the Content back in as a Draft or Publish the Content, operating on the state of the Web Page, and actually move the Web Page through the work flow pipeline. The Metadata portion in Microsoft Word appears as properties in a document properties panel, the Fields appear as sections in the canvas of the Word document, and the State commands (Check In, Check Out, Draft, Publish, etc.) for operating on the Web Page appear in a tab line (see FIG. 3). So in this case the author could open the document properties panel and could type in Metadata for a Scheduling Start Date, the ID for a Page Layout, and a Contact. Below that they would see the area that makes up the canvas of the document and there they would see, in this case, two regions; one of them would be for the Content (text or html) and one would be for an Image, in a representation of the Web Page. Word's knowledge of those pieces of information and their type presents the user with a text typing experience for the Content and an image picking experience for the Image, allowing the user to insert an image stored on the hard drive for example.

The user may also edit the Content Field, add new information, or delete old information, or any combination of the three.

FIG. 2 shows a schematic/block diagram of a web page being posted by a client back to a server in one embodiment. Referring now to FIG. 2, after the user has finished working offline on the Web Page, the user may Post the Web Page for Publishing back to the Server, or Post the Web Page as a Draft back to the Server for further review. The Web Page that was opened through Word via a connection to the Server may also be saved from Word to the Server through reestablishing the connection. In Posting the Draft Page or Posting the Published Page from the Client via Word, all the Metadata, State, and Field information must again be consolidated or compiled and sent to the Server. The Server recognizes if there is a new Title or Summary, or if there is a new Image, or if the Page Layout has been changed, or if the Scheduling Start Date has been set to Publish the Web Page, and the Server will then act accordingly. So, both in FIG. 1 and FIG. 2, in conveying the communication back and forth between Server and Client, both sides have to process and send complete data to make this scenario work. The Server understands what is Content Fields, Metadata, and State, and the things the Server must do because of the changes that were made and what operations need to be performed by the Server. It is up to the Server to decide how to deal with the content once received. For example, in the case of the Image, the Server has to figure out where to store the Image on the Server and then link to it from the HTML of the page.

Figure 3:
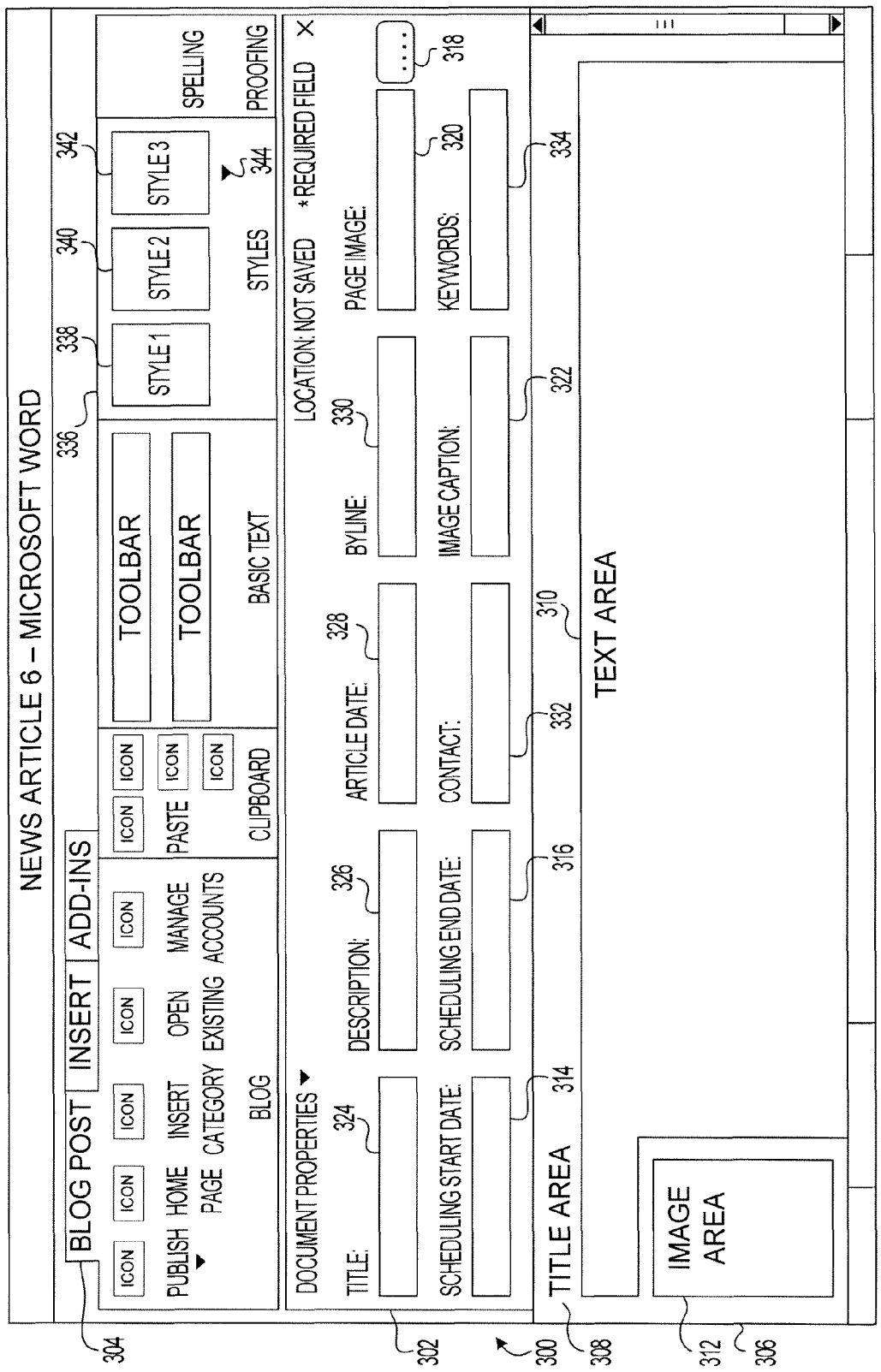
FIG. 3 shows a simplified representation of a screen shot of a Client utilizing Microsoft Word for offline editing of a Web Page in one embodiment.

FIG. 3 shows a simplified representation of a screen shot of a Client utilizing Microsoft Word for offline editing of a Web Page in one embodiment. Referring now to FIG. 3, Screen Shot 300 shows a Document Properties Panel 302 with various properties where data may be entered in several text entry boxes. The State commands for operating on the Web Page appear in Tab Line 304, where Blog Post has been selected. The Fields appear as areas in Canvas Section 306. Title Area 308, Text Area 310, and Image Area 312 are all within Canvas Section 306. The user will be able to see whatever Metadata is relevant to the document they are authoring or updating. The user may modify the Metadata, the Fields, and alter the current State all at one time.

In FIGS. 1 and 2, the user opened an existing item from the Server in order to make changes to it. However, the user may first start with the Client, such as shown in FIG. 3, to create an item for posting to the Server. The user may start from a template in Word that is essentially a pre-packaged starting point where most of the content is empty. Some of the Metadata, such as the current State, typically Checked Out, would already be populated. The user can then proceed to create a new item and may type in information in any of the text entry boxes in Document Properties Panel 302 that are relevant to the particular item being created. Entering a Scheduled Start Date in Text Entry Box 314 will tell the Server when to make the item live on the website. Entering a Scheduled End Date in Text Entry Box 316 will tell the Server when to take the item down from the website. The dates, in addition to day, month, and year will typically include a time of day, such as 2:00 am. Browse Button 318 may be used to browse for an Image on the local hard drive or on the Internet, and the location on the hard drive or the URL of the Image selected is place in Text Entry Box 320. An Image Caption may be entered in Text Entry Box 322. Similarly, the user may enter a Title in Text Entry Box 324, a Description in Text Entry Box 326, an Article Date in Text Entry Box 328, a Byline in Text Entry Box 330, and a Contact in Text Entry Box 332.

Styles Panel 336 has multiple style controls, such as Style 1 Control 338, Style 2 Control 340, and Style 3 Control 342 shown, plus others that may be accessed by clicking on Down Arrow 344. These server styles are available to apply to the content being entered in Canvas Section 306. Styles typically affect font face, font size, font color, as well as things like background color, border, padding and margin, and positioning. A user may highlight the content in Canvas Section 306, then click on one of the style controls, such as Style 1 Control 338, and immediately see the effect displayed in Canvas Section 306. Microsoft Word typically has a default set of styles. With the protocol extensions, the Server passes down the style definitions, letting the Client show the same styles as the Server. The content in Title Area 308, Text Area 310, Image Area 312 will render differently if first selected, and then a different style control is selected, such as Style 2 Control 340.

A Keyword may be entered in Text Entry Box 334. A Keyword is a way to tag data with a formal taxonomical term. For example, if the Content to be published here is about wine, but more particularly about red wine, and even more particularly about red wine from a particular place in France, choosing a Keyword which is supported by a taxonomy functionality would allow a subsequent viewer of the Content to search for all the articles written by the author listed in Byline Text Entry Box 330 on the subject of wine. The Keyword is a piece of taxonomic metadata that is not just a simple string but is an identifier that actually represents a term that is managed by the Server. Once the Keyword is set as Metadata on the web page, the Server understands this in the context of searches performed by a user.

Ratings are another form of taxonomic metadata that can be incorporated in Keyword or a separate Metadata Field. In Keyword, the word "Rating" followed by a range of possible values, such as 1, 2, 3, 4 or 5 for example, allows a user to rate the article or the web page content or website which is translated into a star rating. Because the Server understands the Metadata and knows what to do, the Server can render the number of stars and offer searches by users for highly rated items related to a particular subject.

An auto complete feature is another functionality supported by the extensions. For example, with Keywords, as well as other possible Metadata, as the user begins to type in a Text Entry Box that is enabled with the auto complete feature, an additional call is made to the Server which returns to the Client a drop down list of available choices based upon the initial text input by the user. This is an out-of-band request that happens from the Client to the Server and back to the Client to help populate a taxonomically supported field. This functionality may also operate on the extensions for the State, providing the user with potential options.

Suppose in this example that the user is creating a blog from a template, and that the user wants to have the blog published at 4:00 p.m. Eastern Standard Time on a news website. This Scheduled Starting Date is entered into Text Entry Box 314. When the user is finished with creating the blog, the user Posts the blog for Publishing back to the Server. The Server, upon receiving the blog, prepares the Web Page according to the Metadata, State, and Field data, and stores the data. Then, at 4:00 p.m. Eastern Standard Time, the Server makes the blog available so that for any viewers that request the Web Page on or after 4:00 p.m. Eastern Standard Time, the Server will render and deliver that Web Page to the viewer. Or, if the content is just one of many items on a web page, such as a news website, any viewers who request the news website page on or after 4:00 p.m. Eastern Standard Time will receive the news website page with the new content.

Other Clients that could be employed similarly as just described for Microsoft Word include Windows Livewriter and Office SharePoint Server. One skilled in the art will recognize that many more suitable Clients could also be employed.

Figure 4:
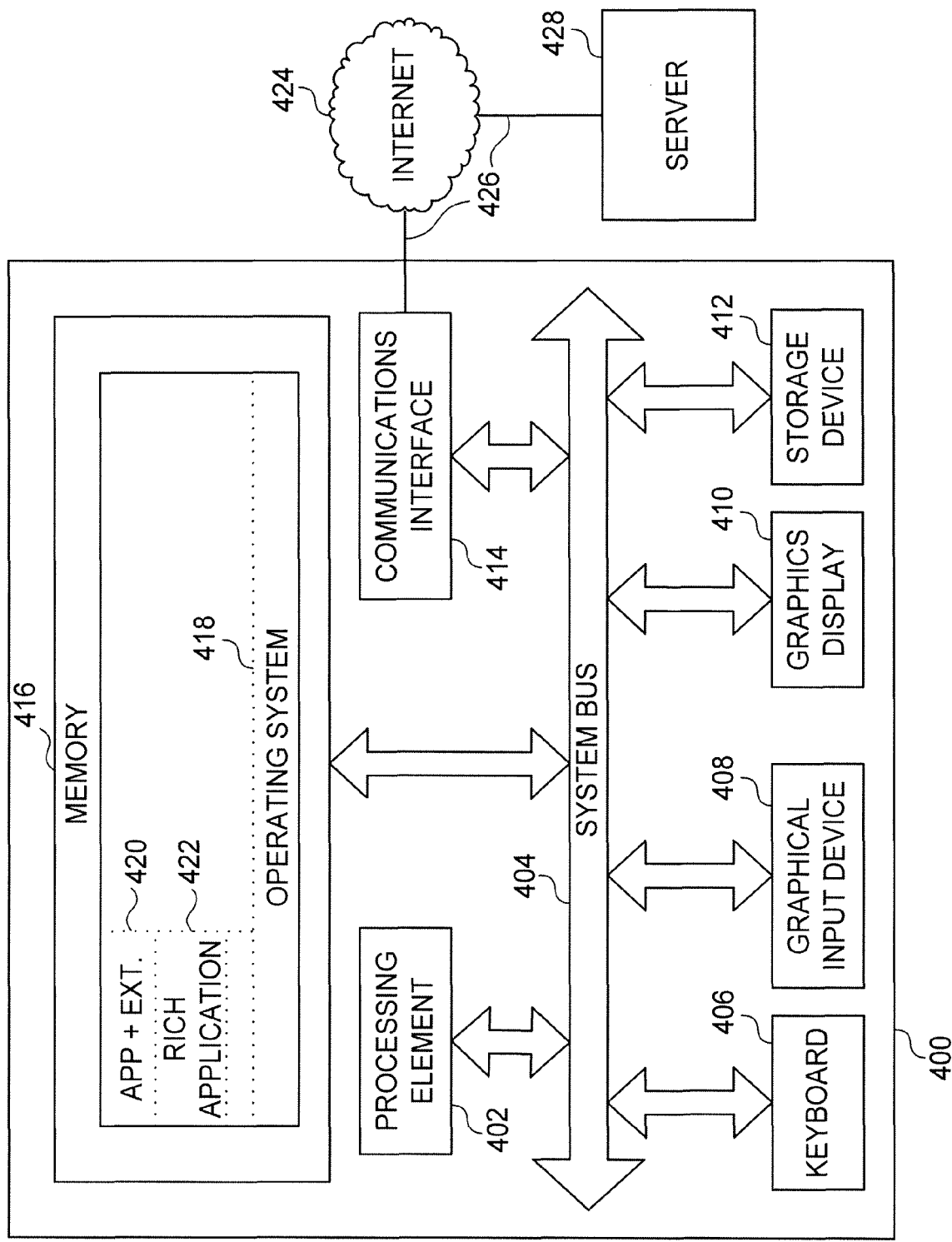
FIG. 4 shows a schematic/block diagram of a client computer system capable of implementing extended publishing protocols.

FIG. 4 shows a schematic/block diagram of a client computer system capable of implementing extended publishing protocols. The system may also be implemented on a mainframe computer system, a networked distributed computer system, hand held computing devices, or any other suitable processing system. The computer system shown in FIG. 4 is one of many different embodiments possible. Referring now to FIG. 4, components of a Computer System 400 may include, but are not limited to, the following elements. Processing Element 402 communicates to other elements of the Computer System 400 over a System Bus 404. A Keyboard 406 allows a user to input information into Computer System 400, and a Graphics Display 410 allows Computer System 400 to output information to the user. Graphics Display 410 may also be touch screen enabled, allowing a user to input information into Computer System 400 through this mode. Graphical Input Device 408, which may be a mouse, joy stick, or other type of pointing device, is also used to input information. A Storage Device 412 is used to store data and programs within Computer System 400. A Memory 416, also connected to System Bus 404, contains an Operating System 418, the APP+Extensions Software 420, and Rich Application Software 422, which may be a word processing application, spreadsheet application, slide presentation application and the like. A Communications Interface 414 is also connected to System Bus 404. Communications Interface 414 may have one or more serial ports, parallel ports, infrared ports, and the like. Connectable through Communications Interface 414 may be an external printer or scanner, as well as access to a computer network (LAN or WAN, not shown), or to the Internet 424 via Communication Channel 426. Computer System 400 may also communicate with Server 428 via Internet 424 and Communication Channel 426.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications of the invention will suggest themselves without departing from the scope of the present invention.

What is claimed is:

1. A method for modeling content for presentation on a website, the method comprising:

creating the content in an offline process with a rich application that utilizes a web publishing protocol that has been extended, wherein the content comprises at least a one of a metadata, a state data, a content field data, and a server style, wherein said metadata provides rendering information for the content;

establishing an online connection between said rich application and a server; and posting the content having said at least a one of said metadata, said state data, said content field data, and said server style via said rich application to said server wherein said at least one state data is selected from the group consisting of published, checked out, draft, pending approval, approved, and rejected.

2. The method according to claim 1 further comprising:
processing the content by said server according to said at least a one of the following: said metadata, said state data, said content field data, and said server style to prepare the content for display on a web page.

3. The method according to claim 2 further comprising:
opening said web page on said server by said rich application;
receiving said at least a one of the following: said metadata, said state data, said content field data, and said server style associated with said content of said web page in said rich application;
editing at least a one of the following: said at least a one of said metadata, said state data, and said content field data of said content of said web page;
applying at least a one of said server style to said content of said web page; and
posting said edited content of said web page via said rich application to said server.

4. The method according to claim 1 wherein creating the content in an offline process with said rich application comprises creating the content with said rich application being at least a one of the following: a word processor and a content publishing application.

5. The method according to claim 1 wherein said creating further comprises at least one of the following:
entering a scheduling start date in a first metadata field, wherein said scheduling start date determines when the content will go live on the website;
entering a scheduling end date in a second metadata field, wherein said scheduling end date determines when the content will expire on the website;
entering a contact ID in a third metadata field, wherein said contact ID identifies a user assigned as a contact for the content on the website;
entering a contact name in a fourth metadata field, wherein said contact name identifies said user assigned as said contact for the content on the website;
entering a contact email address in a fifth metadata field, wherein said contact email address is that of said user assigned as said contact for the content on the website;
entering a contact picture URL in a sixth metadata field, wherein a picture of said contact is located by said contact picture URL;
entering a page layout ID in a seventh metadata field, wherein said page layout ID represents a template assigned for the content on the website;
entering an audience targeting ID in an eighth metadata field, wherein said audience targeting ID represents an audience that the content on the website is targeted to;
entering a keyword in a ninth metadata field, wherein said keyword is supported by a taxonomy functionality on said server allowing for searching by said keyword; and
selecting the content and selecting said server style to apply to the content.

6. The method according to claim 1 wherein said at least one content field data is selected from the group consisting of a text and an image.

7. The method according to claim 1 further comprising:
performing a portion of said creating step in an online process where said rich application is connected to said server;
entering text into a text entry box for said at least one metadata;
making an additional call to said server and passing said entered text to said server;
returning to said rich application a drop down list of available choices based upon said text entered into said text entry box; and
selecting one of said available choices from said drop down list to complete the entering of said text into said text entry box.

8. A computer system for modeling content for presentation on a website, the system comprising:
a client computing device;
a rich application software running on said client computing device for creating the content;
a web publishing protocol software that has been extended running on said client computing device, wherein said extended web publishing protocol supports adding metadata, state data, field data, and server style to the content, wherein said metadata is employed in rendering the content wherein said state data is selected from the group consisting of published, checked out, draft, pending approval, approved, and rejected; and
a server in communication with said client computing device, wherein said rich application posts the content to said server.

9. The system according to claim 8 wherein said server processes the content according to said metadata, said state data, said field data, and said server style to prepare the content for display on a web page.

10. The system according to claim 8 wherein said rich application is at least a one of a word processor and a content publishing application.

11. The system according to claim 8 wherein said metadata further comprises at least one of the following:
a scheduling start date, wherein said scheduling start date determines when the content will go live on the website;
a scheduling end date, wherein said scheduling end date determines when the content will expire on the website;
a contact ID, wherein said contact ID identifies a user assigned as a contact for the content on the website;
a contact name, wherein said contact name identifies said user assigned as said contact for the content on the website;
a contact email address, wherein said contact email address is that of said user assigned as said contact for the content on the website;
a contact picture URL, wherein a picture of said contact is located by said contact picture URL;
a page layout ID, wherein said page layout ID represents a template assigned for the content on the website;
an audience targeting ID, wherein said audience targeting ID represents an audience that the content on the website is targeted to;
a keyword, wherein said keyword is supported by a taxonomy functionality on said server allowing for searching by said keyword; and
a server style applied to the content.

12. The system according to claim 8 wherein said at least one content field data is selected from the group consisting of a text and an image.

13. A computer readable storage medium storing instructions that, when executed by a processor, cause the processor to perform a method for modeling content for presentation on a website, the method executed by the instructions comprising:
creating the content in an offline process with a rich application running in the processor that utilizes a web publishing protocol that has been extended, wherein the content comprises at least a one of a metadata, a state data, a content field data, and a server style, where said metadata comprises content rendering information, the content rendering information comprising information for determining when the content will be go live on a website and when the content will expire from the website wherein said at least one state data is selected from the group consisting of published, checked out, draft, pending approval, approved, and rejected;

establishing by said processor an online connection between said rich application and a server; and posting the content via said rich application running in the processor to said server.

14. The tangible computer readable storage medium according to claim 13 further comprising:

processing the content by said server according to said at least a one of said metadata, said state data, said content field data, and said server style to prepare the content for display on the website.

15. The computer readable storage medium according to claim 13 wherein said rich application is at least a one of the following: a word processor and a content publishing application.

16. The computer readable storage medium according to claim 13 further comprising:

entering a scheduling start date in a first metadata field, wherein said scheduling start date determines when the content will go live on the website;

entering a scheduling end date in a second metadata field, wherein said scheduling end date determines when the content will expire on the website;

entering a contact ID in a third metadata field, wherein said contact ID identifies a user assigned as a contact for the content on the website;

entering a contact name in a fourth metadata field, wherein said contact name identifies said user assigned as said contact for the content on the website;

entering a contact email address in a fifth metadata field, wherein said contact email address is that of said user assigned as said contact for the content on the website;

entering a contact picture URL in a sixth metadata field, wherein a picture of said contact is located by said contact picture URL;

entering a page layout ID in a seventh metadata field, wherein said page layout ID represents a template assigned for the content on the website;

entering an audience targeting ID in an eighth metadata field, wherein said audience targeting ID represents an audience that the content on the website is targeted to;

entering a keyword in a ninth metadata field, wherein said keyword is supported by a taxonomy functionality on said server allowing for searching by said keyword; and selecting the content and selecting said server style to apply to the content.

17. The tangible computer readable storage medium according to claim 13 wherein said at least one content field data is selected from the group consisting of a text and an image.

* * * * *